United States Patent
Suehiro et al.

(10) Patent No.: US 8,423,741 B2
(45) Date of Patent: Apr. 16, 2013

(54) STORAGE CONTROL DEVICE AND DATA PROCESSING SYSTEM

(75) Inventors: Masaya Suehiro, Tokai (JP); Tatsuya Maruyama, Hitachi (JP); Tsutomu Yamada, Hitachinaka (JP); Hideaki Suzuki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 105 days.

(21) Appl. No.: 13/191,631

(22) Filed: Jul. 27, 2011

(65) Prior Publication Data

US 2012/0030444 A1 Feb. 2, 2012

(30) Foreign Application Priority Data

Jul. 27, 2010 (JP) ................................ 2010-168162

(51) Int. Cl.
*G06F 12/00* (2006.01)
(52) U.S. Cl.
USPC .................................. 711/166; 711/E12.001
(58) Field of Classification Search .................. None
See application file for complete search history.

(56) References Cited

U.S. PATENT DOCUMENTS

| 7,590,806 | B2 * | 9/2009 | Harris et al. | 711/154 |
| 7,694,086 | B1 * | 4/2010 | Bezbaruah et al. | 711/162 |
| 2005/0071557 | A1 * | 3/2005 | Kawamura et al. | 711/114 |
| 2010/0205353 | A1 * | 8/2010 | Miyamoto et al. | 711/103 |

FOREIGN PATENT DOCUMENTS

| JP | 09-128276 | 5/1997 |
| JP | 2001-296911 | 10/2001 |
| JP | 2005-259041 | 9/2005 |
| JP | 2008-167329 | 7/2008 |
| JP | 2010/002968 | 4/2010 |

OTHER PUBLICATIONS

JP Office Action for Japanese Patent Application No. 2010-168162 issued on Oct. 30, 2012.

* cited by examiner

*Primary Examiner* — Edward Dudek, Jr.
*Assistant Examiner* — John P Fishburn
(74) *Attorney, Agent, or Firm* — Antonelli, Terry, Stout & Kraus, LLP.

(57) ABSTRACT

A storage medium management part includes a stored data amount adjustment part that: stores a maximum data amount which the storage medium can store at the time of startup of a storage control device, and a stored data amount which is an initial stored amount, in a data amount storage part; upon receiving a write amount of a data in response to a write request, writes a new stored data amount calculated by adding the write amount to the already stored data amount, over the already stored data amount; calculates a free space by subtracting the stored data amount from the maximum data amount; determines a deletion amount of the data if the free space does not takes a value not less than a prescribed value; and writes a newly-calculated stored data amount calculated by subtracting the deletion amount from the stored data amount, over the stored data amount.

7 Claims, 15 Drawing Sheets

Processing of partitioning data into blocks under ten seconds,
which is a problem.
In Japanese Laid-Open Patent Application, Publication
No. 2005-259041 as described above, access to a storage
medium is required to obtain a data amount in the storage
medium before the data amount adjustment. Thus, the above-
described problem is unavoidable.

The present invention has been made in an attempt to solve
the aforementioned problems and to provide a storage control
device and a data processing system in which a data amount
in a storage medium can be immediately adjusted before the
storage medium becomes full, and stored log can be effec-
tively utilized.

A storage control device which collects data outputted
from a plurality of measurement targets and stores the col-
lected data in a storage medium includes: a control part that
makes a write request of the collected data to the storage
medium; and a storage medium management part manages a
data amount stored in the storage medium. The storage
medium management part includes: a stored data amount
adjustment part that: stores a maximum data amount which
the storage medium can store at the time of startup of the
storage control device, and a first stored data amount which is
an initial stored amount of a stored data, in a data amount
storage part; upon receiving a write amount of a data in
response to a write request, writes a new stored data amount,
as a second stored data amount, calculated by adding the write
amount to the first already-recorded stored data amount, over
the first already-recorded stored data amount; calculates a
free space by subtracting the second stored data amount from
the maximum data amount; determines a data deletion
amount if the free space does not takes a value not less than a
prescribed value; and writes a third stored data amount cal-
culated by subtracting the deletion amount from the second
stored data amount, over the second stored data amount, and
a storage medium control part that: upon receiving the dele-
tion amount, identifies a data stored in the storage medium
and corresponding to the deletion amount; instructs a deletion
of the data; and stores the data corresponding to the write
request, in the storage medium.

The storage control device is connected to an external
computer via a communication line. The control part
includes: a data reception part that receives the collected data;
a received data buffer that, upon receiving the collected data,
temporarily holds the received collected data; and a data
partition processing part that partitions the collected data
stored in the received data buffer into blocks according to a
prescribed condition and makes a write request of the stored
collected data to the storage medium. The storage medium
management part further includes a storage medium access
determination part that determines, upon receipt of a request,
whether the request is a read request from the computer or a
write request from the control part and provides control of
prioritizing the write request. The storage medium access
determination part: transmits, upon receiving the write
request, a write amount of a data corresponding to the write
request, to the stored data amount adjustment part; and also
transmits the data corresponding to the write request, to the
storage medium control part.

DETAILED DESCRIPTION OF THE EXEMPLARY EMBODIMENT

As described above, the present invention relates to a storage control device and a data processing system in which various data outputted from a plurality of measurement targets such as machines and sensors are recorded. First is described a data processing system using the storage control device of the present invention. Then, the storage control device of the invention is described.

The present invention is applicable to use in an industrial field in which data outputted from measurement targets such as machines and sensors which operate 24 hours a day is continuously collected and is subjected to analysis. For example, the present invention is applicable to a use in collecting data outputted from a machine operated in a factory by which products or parts are manufactured all day and night, with a purpose of performing productivity evaluation or fault diagnosis. In a mineral mining site or the like, the present invention is applicable to use of collecting data for operation rate measurement of a power shovel, preventive maintenance, or the like. The present invention is also applicable to use in a vehicle/marine vessel/aircraft for purpose of safety.

The present invention is also applicable to a case in which an embedded computer having resistance to vibration and temperature and capable of analyzing data is used as a computer for analyzing data outputted from measurement targets, and is integrated with the storage control device of the present invention. The following embodiments can be applied to general use of continuously collecting data outputted from measurement targets.

In the present invention, in FIG. 1 to be described later, a stored data amount adjustment part 33 can calculate a data amount in a storage medium 43. The data amount therein can be immediately obtained. Therefore, the data amount can be adjusted before the storage medium 43 becomes full, without failing to collect the data outputted from the measurement targets 40, 41.

Below are described in detail embodiments of the present invention with reference to related drawings.

First Embodiment

Figure 1:
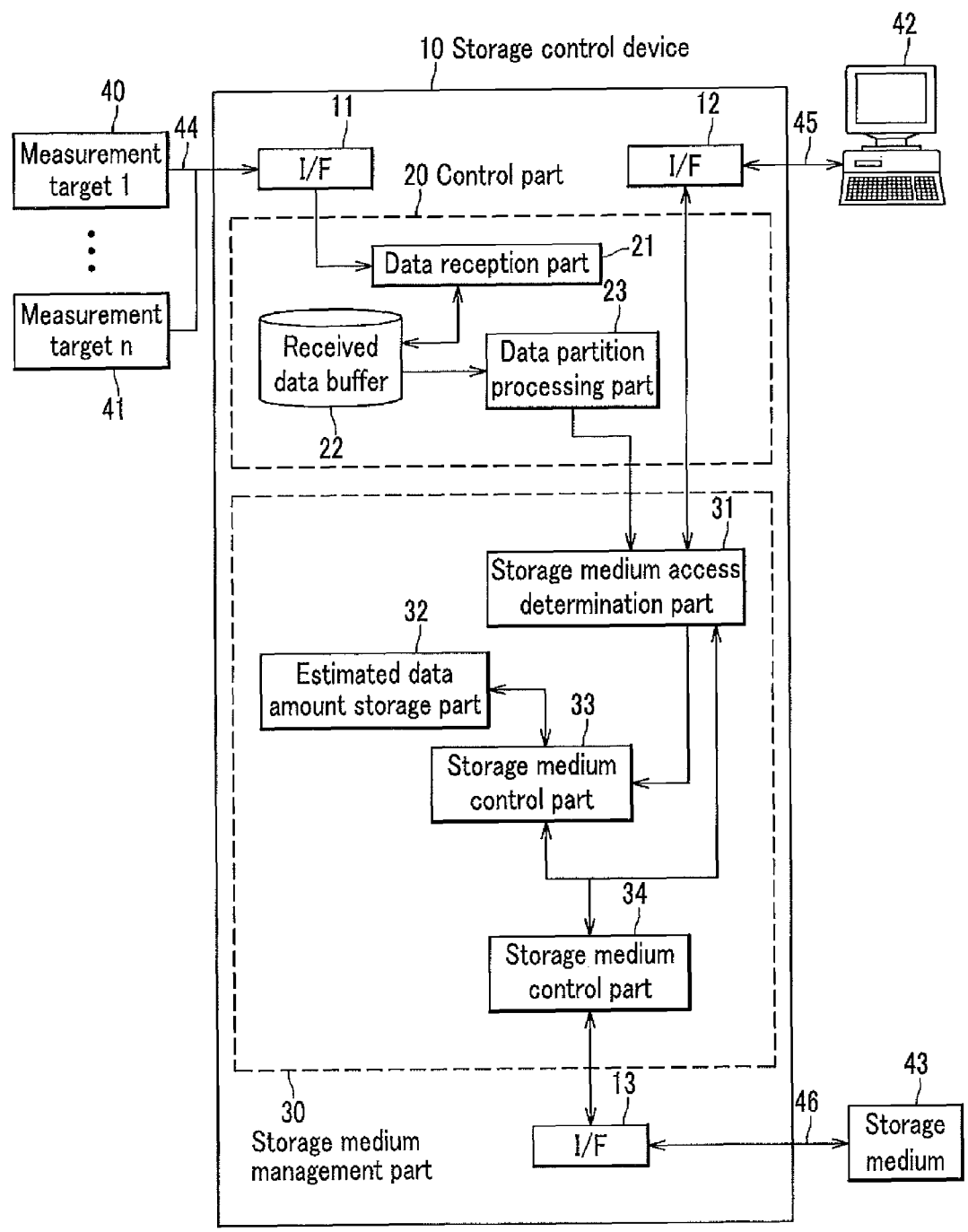
FIG. 1 is a diagram illustrating a data processing system to
which a storage control device is applied according to a first
embodiment of the present invention.

FIG. 1 is a diagram illustrating a data processing system to which a storage control device 10 is applied according to a first embodiment of the present invention. A configuration of the data processing system is described with reference to FIG. 1. Major components of the data processing system include a storage control device 10, and a storage medium 43 that can be attached to the storage control device 10. The storage control device 10 includes: a control part 20; a storage medium management part 30; a data communication interface (to be referred to as I/F hereinafter) 11 that receives data outputted from measurement targets 40, 41 such as machines and sensors; a computer communication I/F 12 that transmits and receives data via a computer 42 such as a PC (Personal Computer) and a communication path 45; and a storage medium communication I/F 13 that transmits and receives data via a storage medium 43 and a communication path 46 of the storage medium 43.

With respect to the communication paths 44, 45, 46, this embodiment is not restricted according to types of communication paths. It is possible to adopt, as the communication path, a wired communication path such as Ethernet (registered trademark) in conformity with the IEEE802.3 specifications, IEEE1394, USB (registered trademark), EIA-232/422/485, CAN (Controller Area Network), ATA (Advanced Technology Attachment), and PATA (Parallel ATA), or a wireless network such as a wireless LAN in conformity with the IEEE802.11 specifications, a sensor network in conformity with the IEEE802.15.4, and a specified low-power radio wireless network. In this embodiment, description is made assuming a case in which CAN, USB, and PATA are adopted as the communication paths 44, 45, 46, respectively, by way of example.

The storage medium 43 stores therein a data collected by the storage control device 10. Various devices can be used as the storage medium 43, such as a hard disk device, a USB memory, a CF card, and a NAS (Network Attached Storage). If a DVD (Digital Versatile Disc) is used as the storage medium 43, both a disk and a drive device constitute the storage medium 43. In this embodiment, description is made in a configuration in which a CF card is adopted as the storage medium 43 by way of example.

The control part 20 includes a data reception part 21, a received data buffer 22, and a data partition processing part 23.

The data reception part 21: collects data outputted from the measurement targets 40, 41 via the communication path 44, via the data communication I/F 11; adds, to the collected data, information on the collected data, for example, a data collection time, a data collection route, specific information on a measurement target as a data output source, and a collected data size; and stores the data in the received data buffer 22.

The data partition processing part 23 partitions the information stored in the received data buffer 22 by the data reception part 21, into blocks according to various conditions, for example, by time unit or by data size; makes a storage medium data output request to a storage medium access determination part 31. The processing performed by the data partition processing part 23 is to be described later in detail.

The storage medium management part 30 includes the storage medium access determination part 31, an estimated data amount storage part 32 (which may also be referred to as a data amount storage part), the stored data amount adjustment part 33, and a storage medium control part 34.

The storage medium access determination part 31 determines, for each of the blocked data, which of the following two is preferentially executed, the storage medium data output request made by the data partition processing part 23 or a storage medium data input/output request made by the computer 42; and accesses the storage medium 43. The storage medium access determination part 31 transmits, if a write request of a data is made, a write data amount of the data to the stored data amount adjustment part 33; and also transmits the data corresponding to the write request to the storage medium control part 34.

If the computer 42 accesses the storage medium 43, then the storage medium access determination part 31: recognizes a command of SCSI (Small Computer System Interface), ATAPI (AT Attachment Packet Interface), or the like issued when the computer 42 accesses the storage medium 43; and transmits the command to the storage medium 43. This allows the computer 42 to access the storage medium 43, using a driver with a USB mass storage class, that is, without using a driver dedicated to the storage control device 10 or a middleware. Such a processing and a determination method performed by the storage medium access determination part 31 are described later in detail.

The stored data amount adjustment part 33 checks a data amount stored in the storage medium 43 which has been stored at the time of startup or connection to the storage medium 43; and stores the data amount in the estimated data amount storage part 32. Further, if it is found by a data output request or the like to the storage medium 43 made by the data partition processing part 23 that a data amount stored in the storage medium 43 is changed, the stored data amount adjustment part 33 estimates a stored data amount based on, for example, the number of files stored in the storage medium 43 or a data collection time outputted by the measurement targets 40, 41; and updates data in the estimated data amount storage part 32. The stored data amount adjustment part 33 determines whether or not adjustment of a storage medium data amount is necessary based on the updated data in the estimated data amount storage part 32, to thereby adjust the storage medium data amount by deleting a file stored in the storage medium 43 or the like.

Assume a case in which a file system such as FAT (File Allocation Table) is constructed in the storage medium 43, and fragmented files thereof are stored in the storage medium 43. In this case, for example, if an unused space in the storage medium 43 is searched, processing load of access to the storage medium 43 is increased, resulting in performance degradation of access to the storage medium 43. Thus, the stored data amount adjustment part 33 performs necessary data amount adjustment such that a space which is contiguous and has a size larger than that of a file to be newly stored in the storage medium 43 is secured, by, for example, deleting an existing file having already been stored in the storage medium 43. This makes it possible to store the file to be newly stored in the contiguous space in the storage medium 43, thus preventing fragmentation of the file. The processing performed by the stored data amount adjustment part 33 is described later in detail.

The storage medium control part 34 receives a storage medium access request made by the storage medium access determination part 31 or the stored data amount adjustment part 33 and controls an input/output access to the storage medium 43 according to a type of the communication path 46 or a file system such as, for example, FAT constructed in the storage medium 43.

Figure 2:
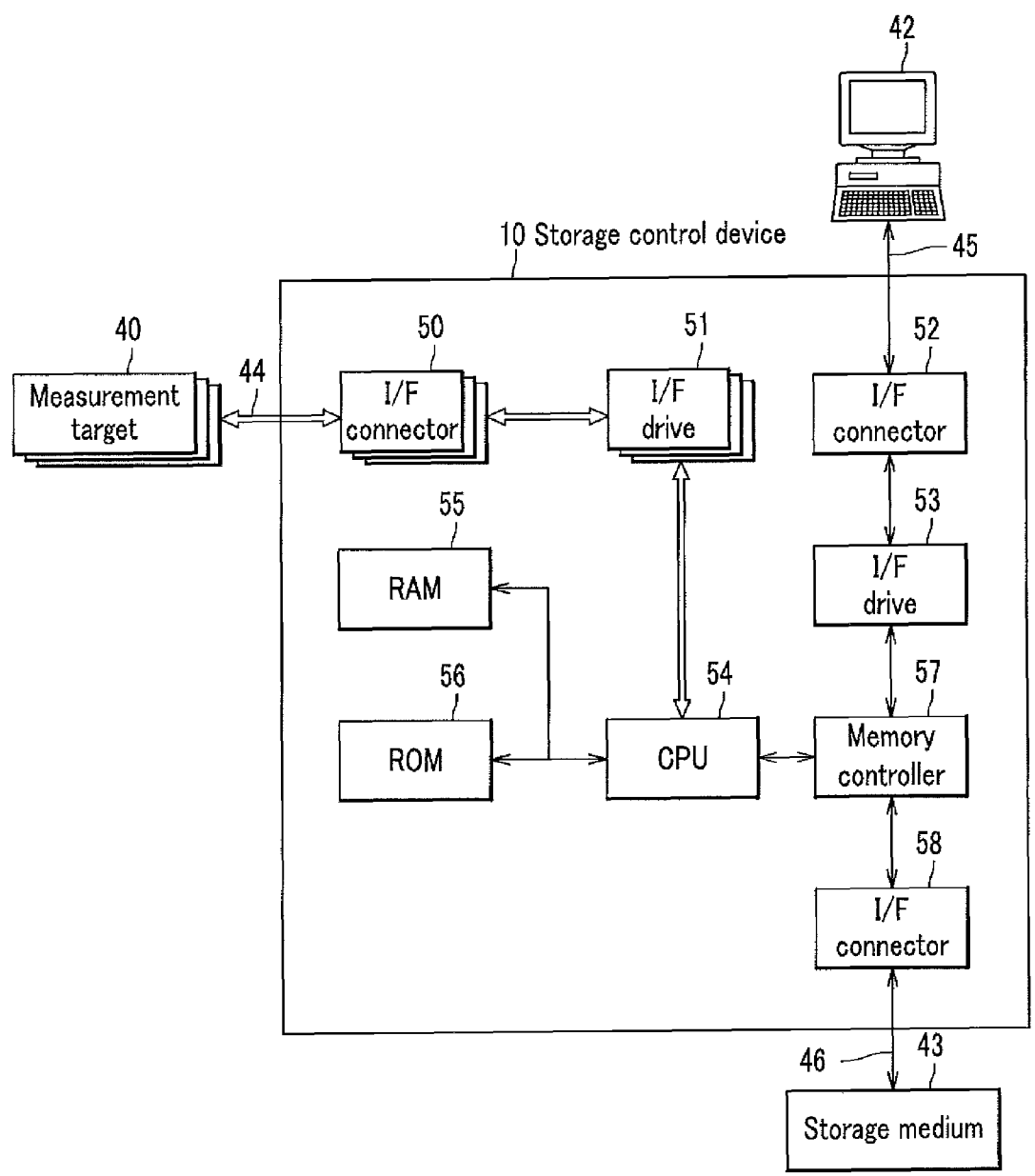
FIG. 2 is a diagram illustrating an example of a configura-
tion of the storage control device according to the first
embodiment.

FIG. 2 is a diagram illustrating an example of a configuration of the storage control device 10 according to the is first embodiment. The configuration of the storage control device 10 is described with reference to FIG. 2. The storage control device 10 includes I/F connectors 50, 52, 58, I/F drives 51, 53, a CPU 54, a RAM 55, a ROM 56, and a memory controller 57. The RAM 55 temporarily holds data outputted by the measurement targets 40, 41 or the like, and functions as a buffer memory. The memory controller 57 has respective communication I/Fs with the CPU 54, the computer 42, and the storage medium 43. Herein, CPU stands for Central Processing Unit; RAM stands for Random Access Memory; and ROM stands for Read Only Memory.

The memory controller 57 performs a processing by the storage medium management part 30 shown in FIG. 1. The CPU 54 performs a processing by the control part 20 shown in FIG. 1. That is, the memory controller 57 reads or writes a data from or to the storage medium 43 in response to a storage medium access request made by the CPU 54 or the computer 42. The memory controller 57 determines, adjusts, and performs timing of the storage medium access request performed by the computer 42, to thereby enable to control access made by the CPU 54 and the computer 42 to the storage medium 43. Note that which component performs which part of the processing is not limited to this. For example, the processing performed by the storage medium access determination part 31 may be instead performed by the CPU 54.

Figure 3:
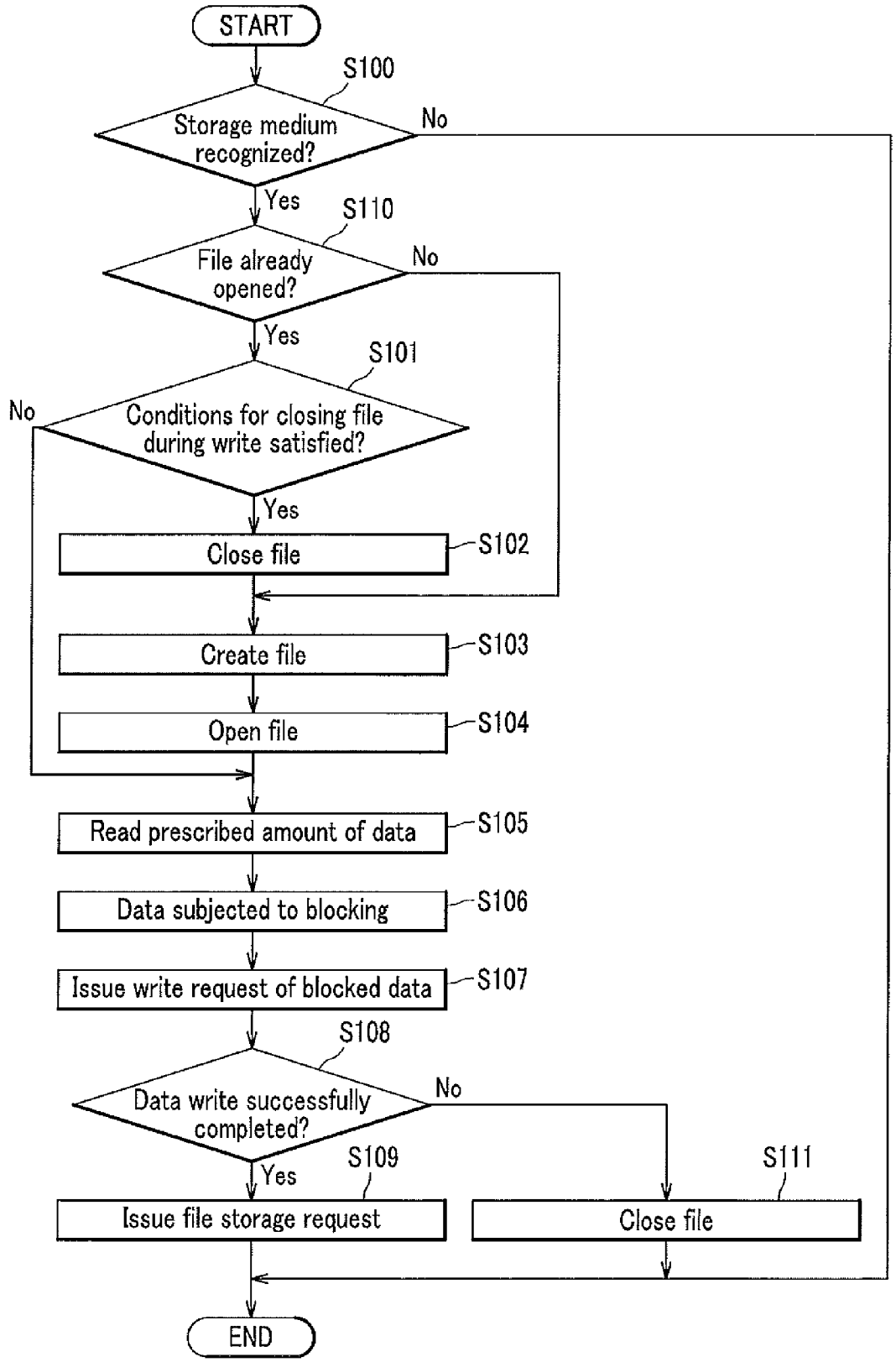
FIG. 3 is a flowchart illustrating a processing performed by
a data partition processing part of the storage control device
according to the first embodiment.

FIG. 3 is a flowchart illustrating a processing performed by the data partition processing part 23 of the storage control device according to the first embodiment. The data partition processing part 23 partitions the acquired data and the information on the acquired data stored in the received data buffer 22, into blocks according to specific conditions, for example, by time unit or by data size. The data partition processing part 23 then issues, for each of the blocked data, a data write request to the storage medium 43. The data partition processing part 23 transmits, to the storage medium management part 30, respective instructions in the processing shown in FIG. 3, namely, a file close, a file creation, a file open, a block data write request issuance, and a file storage request issuance of the storage medium 43. In other words, the data partition processing part 23 also functions as an instruction part.

By partitioning the data into blocks, it is possible to recognize an upper limit of a data write access time to the storage medium 43. This allows a response only with a certain delay time to a request from the computer 42, even if the computer 42 makes a data read request to the storage medium 43 during a data write to the storage medium 43.

Referring to FIG. 3, the processing performed by the data partition processing part 23 is described. The data partition processing part 23 determines whether or not the storage medium 43 is connected to the storage control device 10 and is recognized, that is, is available (step S100). If it is determined that the storage medium 43 is not connected to the storage control device 10, or is connected but is not available (if No in step S100), the processing terminates. If the storage medium 43 is available (if Yes in step S100), the data partition processing part 23 determines whether or not any file in the storage medium 43 is now opened (step S110). If a file has already been opened (if Yes in step S110), the processing advances to step S101. If no file is opened (if No in step S110), the processing advances to step S103.

The data partition processing part 23 determines whether or not conditions for closing the file are satisfied (step S101). If the conditions for closing the file which is now opened are satisfied (if Yes in step S101), the data partition processing part 23 issues a close request of the file (step S102). Then, the data partition processing part 23 issues a new file creation request (step S103) and issues a file open request for opening the new file (step S104). After a data write to the storage medium 43 is ready to be done, the data partition processing part 23 reads a prescribed amount of data from the received data buffer 22 (step S105) and partitions the data into blocks (step S106). The data partition processing part 23 then issues a write request of the blocked data (step S107), and the processing advances to step S108.

The data partition processing part 23 determines whether or not the data write is successfully completed (step S108). If the data write is successfully completed (if Yes in step S108), the data partition processing part 23 issues a storage request of the file which is now opened (step S109) and terminates the processing. On the other hand, if the data write is not successfully completed (if No in step S108), the data partition processing part 23 close the file (step S111). The processing is then terminated.

In the storage control device 10 in this embodiment, a file creation and a data write are performed on an assumption that cycles of the two are different from each other. For example, a file is created every one minute, and a collected data is written every three seconds. Therefore, the condition for closing a file in step S101 is, to be more specific, whether or not a prescribed time period (for example, one minute) has already elapsed.

Figure 4:
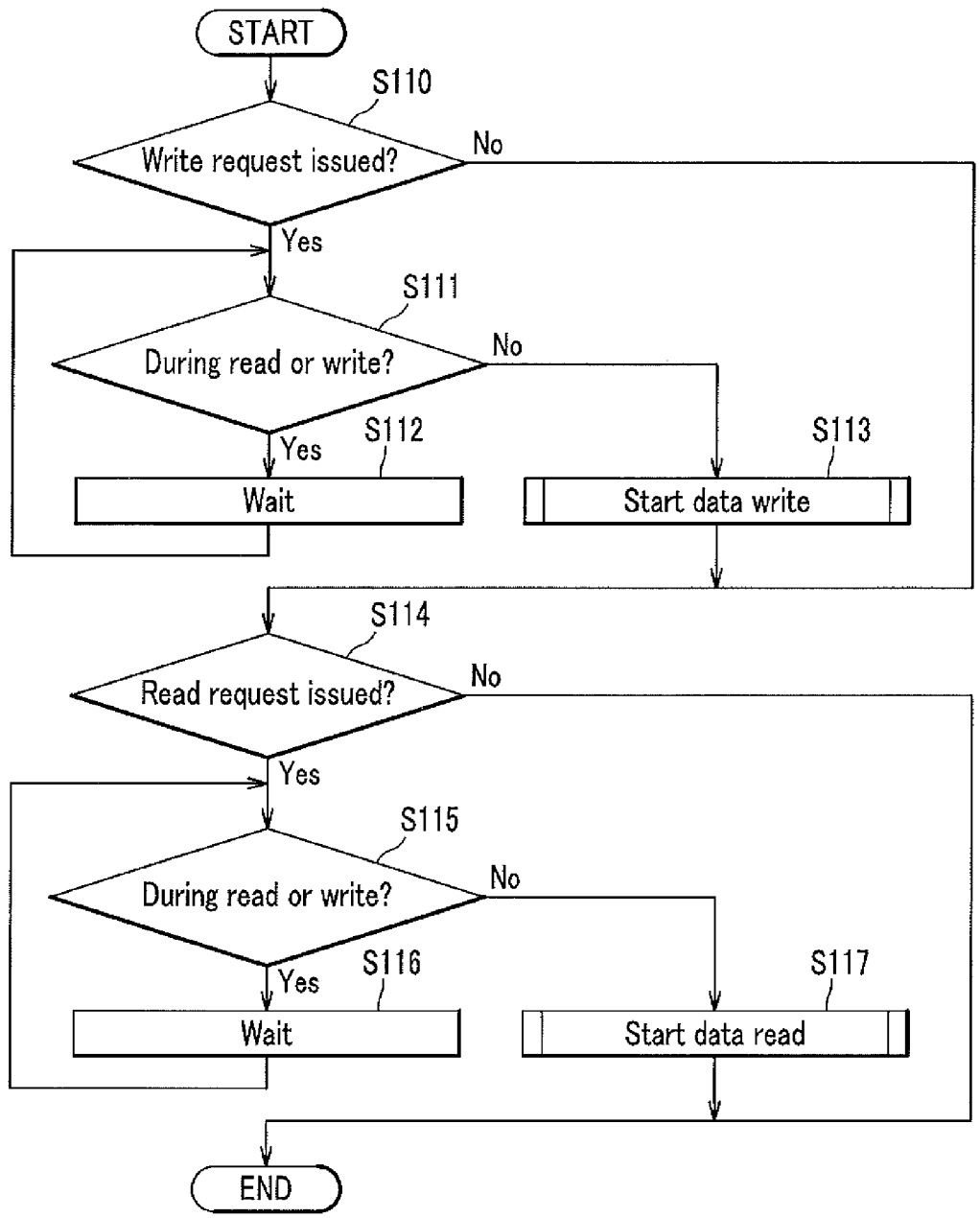
FIG. 4 is a flowchart illustrating a processing performed by a storage medium access determination part of the storage control device according to the first embodiment.

FIG. 4 is a flowchart illustrating a processing performed by the storage medium access determination part 31 of the storage control device 10 according to the first embodiment. The storage medium access determination part 31 receives an access request to the storage medium 43 made by the data partition processing part 23 or the computer 42 and provides such control that an input request and an output request are not issued to the storage medium 43 at the same time. The control of access requests to the storage medium 43 makes it possible to prevent a plurality of data blocks from passing in the communication path 46 concurrently, which can avoid destruction of data in the storage medium 43.

Referring to FIG. 4, the processing performed by the storage medium access determination part 31 is described. The storage medium access determination part 31 determines whether or not a data write request to the storage medium 43 has been issued from the data partition processing part 23 or the computer 42 (step S110). If a data write request has been issued (if Yes in step S110), the storage medium access determination part 31 determines whether or not a data read or a data write is now being performed to the storage medium 43 (step S111). If a data read or a data write is now being performed (if Yes in step S111), the storage medium access determination part 31 waits for a prescribed time period (step S112), and then, determines again whether or not a data read or a data write is now being performed to the storage medium 43 (step S111). If a data read or a data write is not being performed (if No in step S111), the storage medium access determination part 31 starts an appropriate data write to the storage medium 43 (step S113) and then terminates the processing in response to the data write request. On the other hand, in step S110, if no data write request has been issued (if No in step S110), the processing advances to step S114.

The storage medium access determination part 31 determines whether or not a data read request to the storage medium 43 has been issued (step S114). If a data read request has already been issued (if Yes in step S114), the storage medium access determination part 31 determines whether or not a data read or a data write is now being performed to the storage medium 43 (step S115). If a data read or a data write is now being performed (if Yes in step S115), the storage medium access determination part 31 waits for a prescribed time period (step S116), and then, determines again whether or not a data read or a data write is now being performed to the storage medium 43 (step S115). If a data read or a data write is not being performed (if No in step S115), the storage medium access determination part 31 starts an appropriate data read to the storage medium 43 (step S117) and then terminates the processing in response to the data read request. On the other hand, in step S114, if no data read request has been issued (if No in step S114), the processing terminates.

With the above-described processing, a data write request and a data read request are differently prioritized. If a data write request and a data read request are issued at the same time, the data write request is preferentially executed. During a data write or a data read, any other data access request is not accepted, which makes it possible to prevent simultaneous data input/output. Further, the data partition processing part 23 first partitions data into blocks by prescribed data amounts and then issues a data write request. This can minimize a delay time in response to a data read request from the computer 42.

Figure 5:
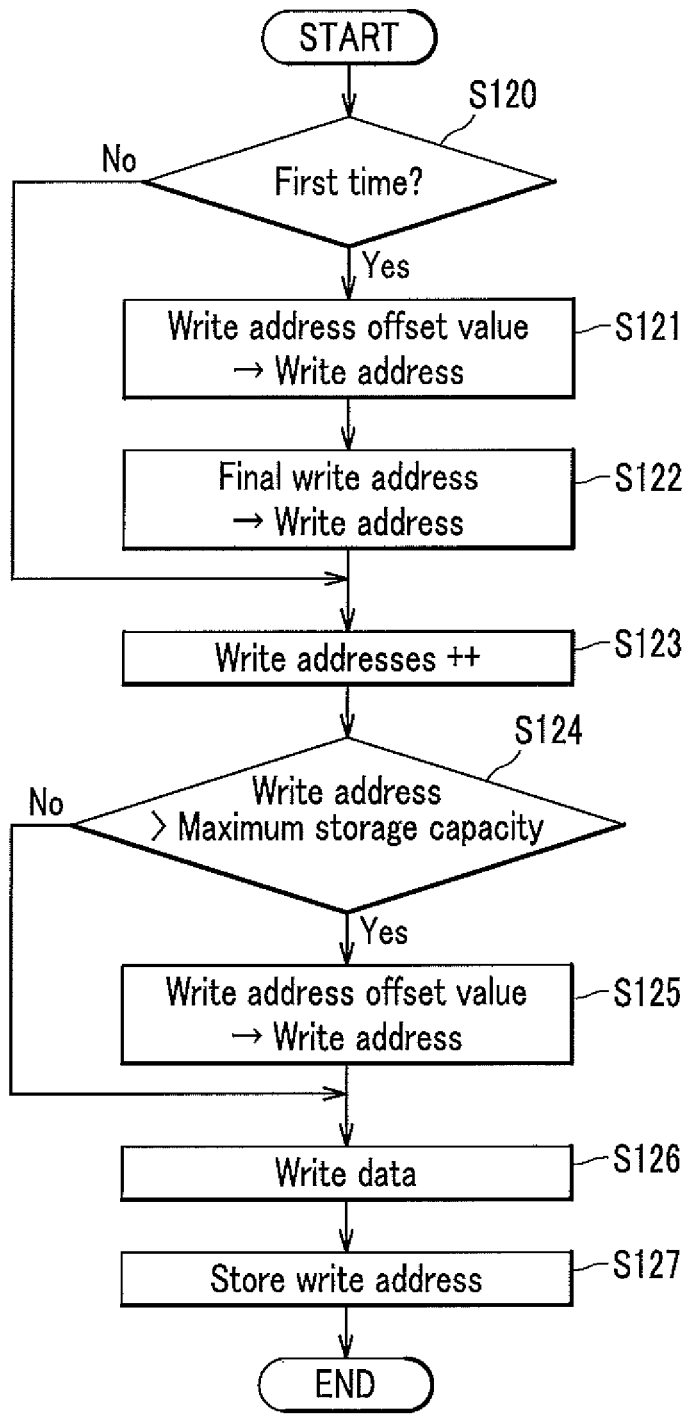
FIG. 5 is a flowchart illustrating a processing of starting a data write to the storage medium performed in the storage control device according to the first embodiment.

FIG. 5 is a flowchart illustrating a processing of starting a data write to the storage medium 43 performed in the storage control device 10 according to the first embodiment. The processing of starting a data write shown in FIG. 5 is performed by the storage medium control part 34. If the storage control device 10 writes a data to the storage medium 43 in which a file system such as FAT is constructed, the storage medium control part 34 of the storage control device 10 is required to specify a write start position of the data. The data write start position specified by the storage control device 10 is hereinafter referred to as a data write address. Similarly, an end position of the data which the storage control device 10 writes last is hereinafter referred to as a last write address.

Prior to a write of data outputted by the measurement targets 40, 41 to the storage medium 43, the storage medium control part 34 specifies a data write address or the like in the storage medium 43. The write of the data outputted by the measurement targets 40, 41 to the storage medium 43 after the data write address is specified, makes it possible to manage how the data is placed in the storage medium 43. The last write address is stored in the storage medium 43 when the write of the data outputted by the measurement targets 40, 41 is completed. This makes it possible to easily specify the last write address at the time of startup of the storage control device 10 and shorten a processing of initializing the storage control device 10.

Referring to FIG. 5, the processing of starting a write of data outputted from the measurement targets 40, 41, to the storage medium 43 is described. The storage medium control part 34 determines whether or not the processing is performed for the first time after the storage control device 10 is started up or the storage medium 43 is recognized (step S120). If it is for the first time (if Yes in step S120), the storage medium control part 34 sets an arbitrary data write address offset value as a data write address of the data (step S121). Then, the storage medium control part 34 reads a data write address at the time when the storage control device 10 operated last time, from the storage medium 43, and sets the read data write address as another data write address (step S122). Because the two data write addresses are set, if the storage medium 43 has not yet been used, an arbitrary data write address offset value is set. If the storage medium 43 has already been used (if No in step S120), the processing advances to step S123. The storage medium control part 34 then sets the data write address as the next address (step S123).

The storage medium control part 34 determines whether or not the data write address exceeds s value of a maximum storage capacity of the storage medium 43 (step S124). If the data write address exceeds the value of the maximum storage capacity if Yes in step S124), the storage medium control part 34 sets an arbitrary data write address offset value as the data write address (step S125). On the other hand, if the data write address does not exceed the value of the maximum storage capacity of the storage medium 43 (if No in step S124), the processing advances to step S126. After the data write address is fixed, the storage medium control part 34 performs the data write processing to the storage medium 43 (step S126). After the data write to the storage medium 43 is completed, the storage medium control part 34 stores the last write address in the storage medium 43 (step S127).

With the above-described processing, a data in the storage medium 43 or an address of a file is placed immediately after an address of another data which has been written last time. This makes it possible to evenly use an available area in the storage medium 43, thus allowing a life of the storage medium 43 to be prolonged.

Figure 6:
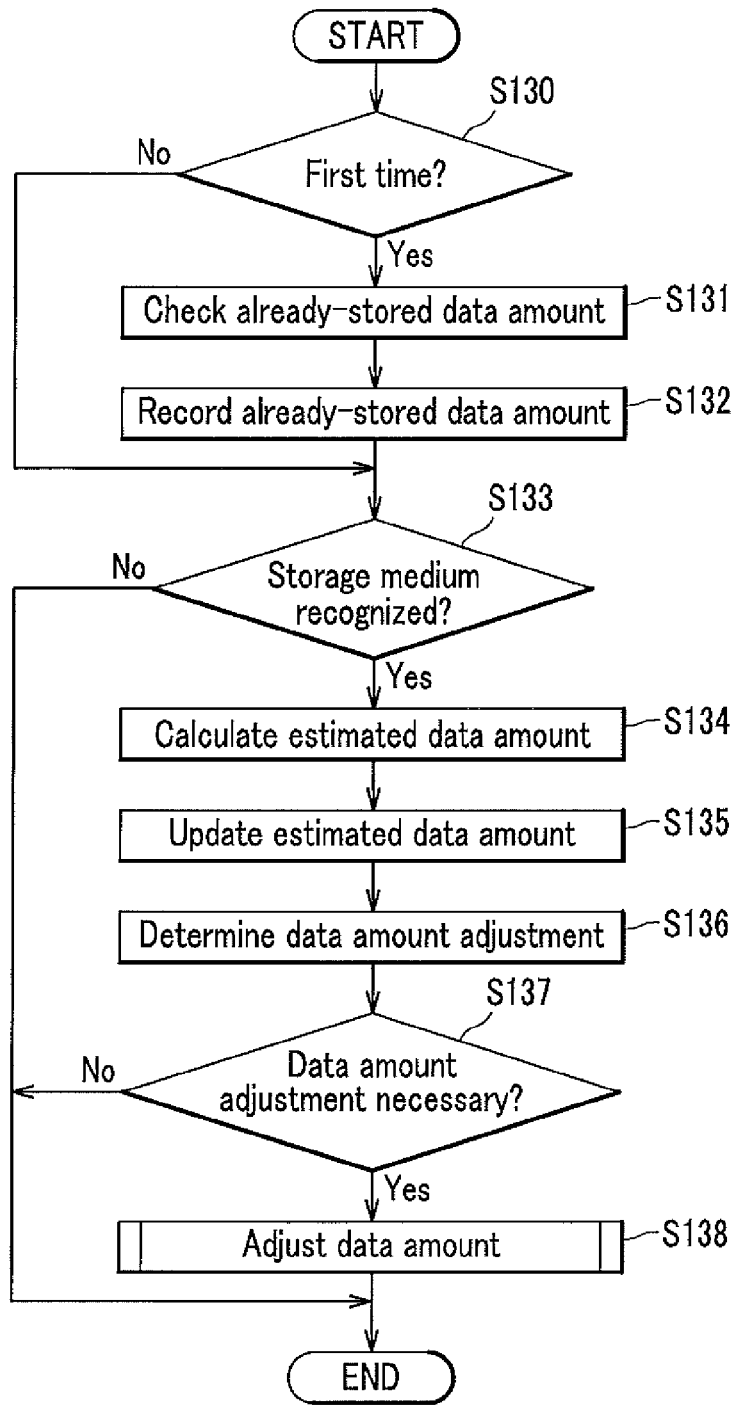
FIG. 6 is a flowchart illustrating a processing performed by a stored data amount adjustment part of the storage control device according to the first embodiment.
Figure 7:
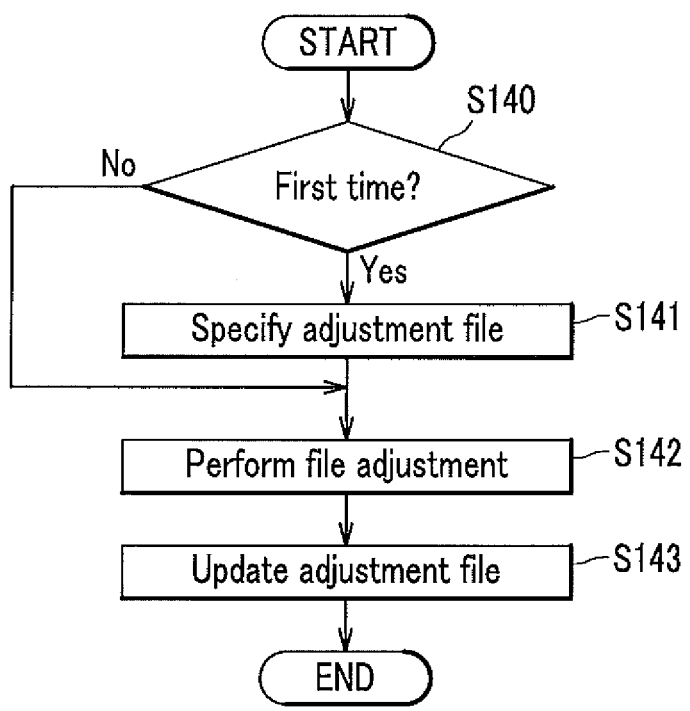
FIG. 7 is a flowchart illustrating a processing of adjusting a data amount performed in the storage control device, according to the first embodiment.

FIG. 6 is a flowchart illustrating a processing performed by the stored data amount adjustment part 33 of the storage control device 10 according to the first embodiment. FIG. 7 is a flowchart illustrating a data amount adjustment processing performed in the storage control device 10 according to the first embodiment.

The stored data amount adjustment part 33 estimates a data amount stored in the storage medium 43 based on the number of stored files, a data collection time, or the like. The term "estimate" used herein is performed without making access to the storage medium 43 for checking a stored data amount in the storage medium 43 each time a write request is made. If it is necessary to adjust a data amount stored in the storage medium 43, the stored data amount adjustment part 33 adjusts the data amount. Such adjustment includes securing a free space which is contiguous and has a size larger than that of a file to be written next, at a position immediately after the last write address of the storage medium 43 specified in the data write start processing. The adjustment is made by, for example, deleting an existing file having already been stored in the storage medium 43. This can prevent fragmentation of a file in the storage medium 43 because the file to be written next is stored in a contiguous area. Therefore, processing load of access to the storage medium 43 by the storage control device 10 can be reduced, and slowdown of an access rate of the storage control device 10 to the storage medium 43 can be prevented.

Referring to FIG. 6, a processing performed by the stored data amount adjustment part 33 is described. The stored data amount adjustment part 33 determines whether or not the processing is performed for the first time after the storage control device 10 is started up or the storage medium 43 is recognized (step S130). If it is the first time (if Yes in step S130), the stored data amount adjustment part 33 checks the data amount having already been stored in the storage medium 43 (step S131) and stores the checked data amount in the estimated data amount storage part 32 (step S132). If it is not for the first time (if No in step S130), the processing advances to step S133.

The stored data amount adjustment part 33 then determines whether or not the storage medium 43 is connected to the storage control device 10 and is available (step S133). If it is determined that the storage medium 43 is not connected to the storage control device 10, or is connected but is not available (if No in step S133), the processing terminates. If the storage medium 43 is available (if Yes in step S133), the stored data amount adjustment part 33 calculates an estimated amount of a data (estimated data amount) to be stored in the storage medium 43, based on a data amount stored in the estimated data amount storage part 32 and a data amount specified by a data write request (step S134) and updates the data amount stored in the estimated data amount storage part 32 (step S135). The stored data amount adjustment part 33 determines whether or not it is necessary to adjust the data amount currently stored, based on the calculated estimated data amount stored in the storage medium 43 so as to secure a prescribed amount of a free space in the storage medium 43 (step S136 and step S137). If it is necessary to adjust the data amount currently stored (if Yes in step S137), the stored data amount adjustment part 33 adjusts the data amount by deleting a file already having been stored or the like (step S138), and the processing terminates. On the other hand, if it is not necessary to adjust the data amount currently stored (if No in step S137), the processing terminates.

Referring to FIG. 7, a processing of adjusting a data amount stored in the storage medium 43 is described. FIG. 7 illustrates details of step S138 of FIG. 6. The stored data amount adjustment part 33 determines whether or not the processing of adjusting a data amount stored in the storage medium 43 is performed for the first time after the storage control device 10 is started up or the storage medium 43 is recognized (step S140). At the time of performing the processing for the first time, the stored data amount adjustment part 33 specifies an adjustment file by, for example, extracting an earliest-updated file from among files stored in the storage medium 43, as the adjustment file (step S141). The stored data amount adjustment part 33 performs a file adjustment by deleting the adjustment file (step S142). Upon the file adjustment by deleting the adjustment file, the stored data amount adjustment part 33 updates the adjustment file by, for example, specifying a second earliest-updated file stored in the storage medium 43 as a new adjustment file (step S143). The processing then terminates.

In step S134, the estimated data amount (or the stored data amount) is generally calculated based on an already-stored data amount and a data amount specified by a data write request. In step S138, if the data amount is adjusted, the estimated data amount is calculated by Expression 1 as follows:

Stored data amount $D$=Initial stored amount $I$+Write amount $W$−Deletion amount $R$     Expression 1

The estimated data amount can also be calculated based on the number of files by Expression 2 as follows:

Number of files $FD$=Initial number of files $FI$+Number of created files $FW$−Number of deleted files $FR$     Expression 2

Preferably, but not necessarily, Expression 2 is used for a device which outputs data having file sizes to be stored fall within a relatively limited range, and Expression 1 is used for a device which outputs data having file sizes to be stored, file sizes to be stored of which outputted data are unbounded.

In step S136 and step S137, in determining whether or not it is necessary to adjust the data amount, the calculated free space is compared to a threshold Th (a prescribed value) which is a predetermined amount of a free space as shown in Expression 3 as follows:

$$\text{Free space Cemp} > \text{Threshold Th} \quad \text{Expression 3}$$

wherein Free space Cemp=Maximum data amount of storage medium Dmax−Stored data amount D If Expression 3 is not satisfied, the data amount is adjusted. Note that an inequality sign in Expression 3 may accompany an equal sign.

Major characteristics of the storage control device 10 according to the first embodiment are summarized in that: the storage control device 10 which collects data outputted from the measurement targets 40, 41 and stores the collected data in the storage medium 43 includes the control part 20 that makes a write request of the collected data to the storage medium 43, and the storage medium management part 30 that manages an amount of data stored in the storage medium 43.

As described above, the storage medium management part 30 includes the stored data amount adjustment part 33 and the storage medium control part 34. In more detail, the stored data amount adjustment part 33: stores a maximum data amount which the storage medium 43 can store therein at the time of startup of the storage control device 10, and a stored data amount which is an initial stored amount of a stored data, in a data amount storage part (for example, the estimated data amount storage part 32); upon receiving a write amount of a data to a write request, writes a new stored data amount calculated by adding the write amount to an already-recorded stored data amount, over the already-recorded stored data amount; calculates a free space by subtracting the stored data amount from the maximum data amount; determines a deletion amount of the data if the free space does not takes a value not less than a prescribed value; and writes a newly-calculated stored data amount calculated by subtracting the deletion amount from the stored data amount, over the stored data amount. The storage medium control part 34: upon receiving the deletion amount, identifies a data corresponding to the deletion amount and stored in the storage medium 43; issues an instruction of deleting the data; and stores the data to which the write request is made, in the storage medium 43.

According to this embodiment, the above-described processing makes it possible to calculate an estimated value of a data amount stored in the storage medium 43 (estimated data amount (stored data amount)) and store the estimated amount in the estimated data amount storage part 32. This eliminates the need to access the storage medium 43 in order to check a data amount stored therein. Therefore, a processing of adjusting a data amount stored in the storage medium 43 can be performed at high speed.

Further, with the processing of adjusting a data amount, a free space is secured which is contiguous and has a size larger than that of a file to be written next, at a position immediately after the last write address of the storage medium 43. This prevents fragmentation of a file in the storage medium 43. Therefore, processing load of access to the storage medium 43 by the storage control device 10 can be reduced, and slowdown of an access rate of the storage control device 10 to the storage medium 43 can be prevented.

Second Embodiment

Figure 8:
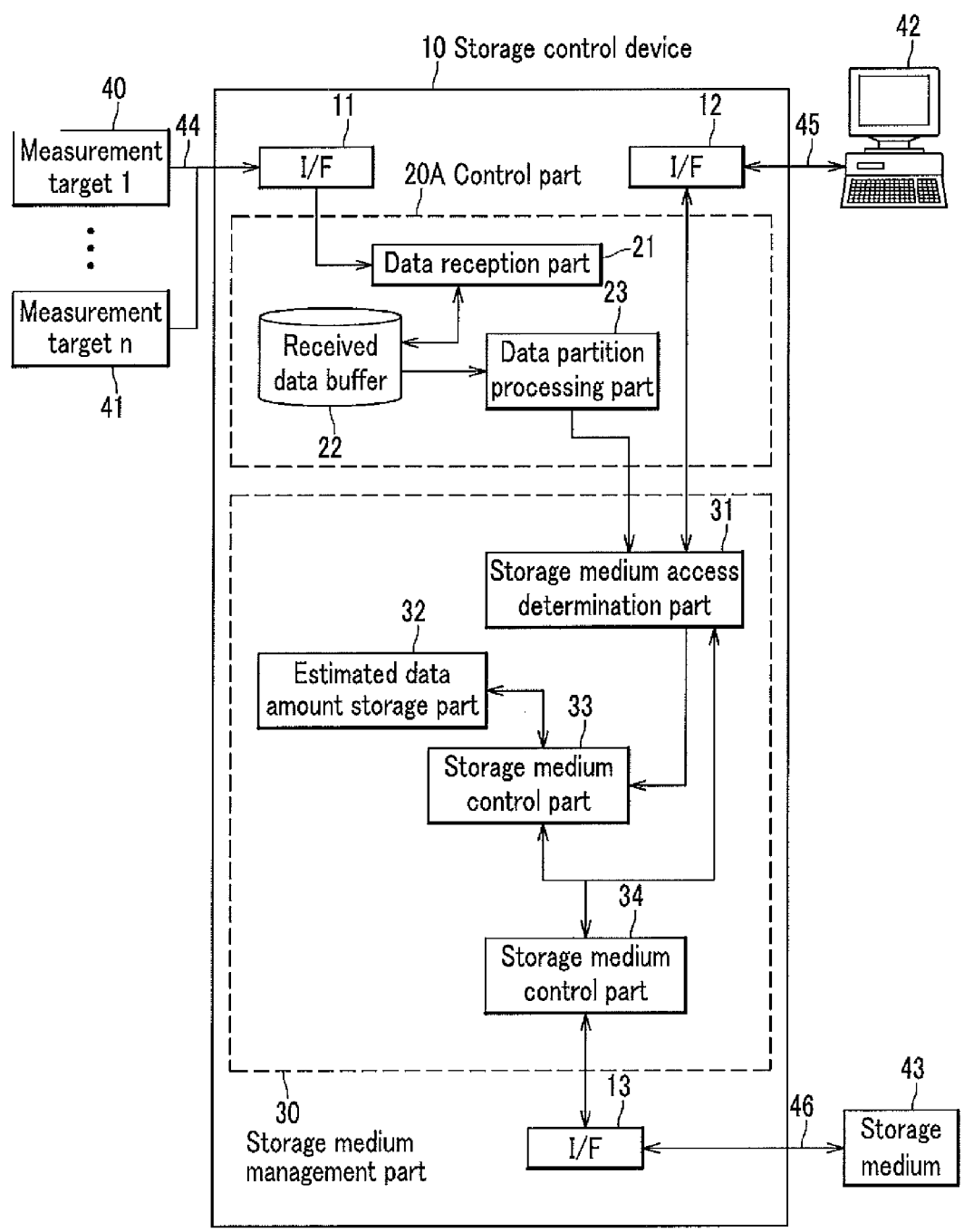
FIG. 8 is a diagram illustrating a data processing system to which a storage control device is applied according to a second embodiment of the present invention.

FIG. 8 is a diagram illustrating a data processing system to which a storage control device is applied according to a second embodiment of the present invention. The same reference numerals are given to the functions and components in the second embodiment similar to those in the first embodiment unless otherwise noted.

In the data processing system in this embodiment, a control part 20A has a configuration different from the counterpart in the first embodiment. The processing performed by the data reception part 21 in the first embodiment shown in FIG. 1 is modified in the control part 20A in the second embodiment. A data reception part 24 also collects information equivalent to the information collected by the data reception part 21 shown in FIG. 1 and stores in the received data buffer 22. However, the data reception part 24 additionally transfers the information directly to the computer 42. The processing performed by the data reception part 24 is described later in detail.

Figure 9:
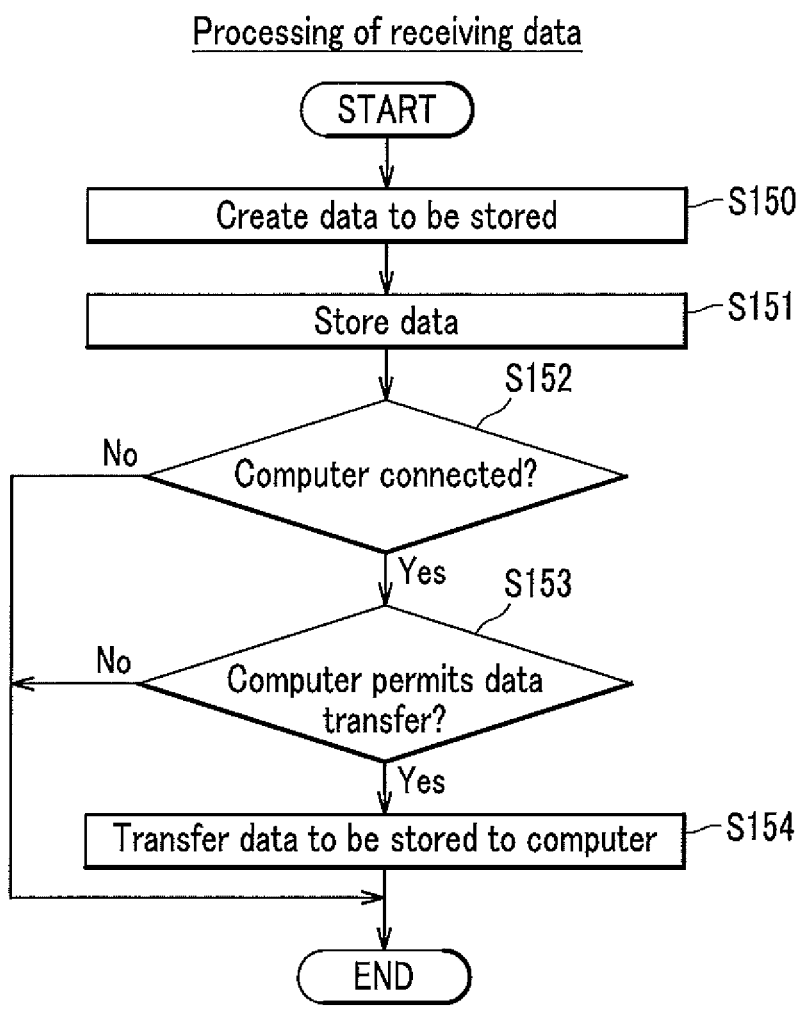
FIG. 9 is a flowchart illustrating a processing performed by a data reception part of the storage control device according to the second embodiment.

FIG. 9 is a flowchart illustrating the processing performed by the data reception part 24 of the storage control device 10 in the second embodiment. The data reception part 24 stores data outputted from the measurement targets 40, 41 as well as information concerning the data, in the received data buffer 22 and also transfers the data and the information to the computer 42. The transfer of the collected data to the computer 42 makes it possible to, for example, conduct analysis of the measurement targets 40, 41 by the computer 42 on a real-time basis.

Referring to FIG. 9, the processing performed by the data reception part 24 is described. Similarly to the data reception part 21 shown in FIG. 1, the data reception part 24: collects data outputted from the measurement targets 40, 41 and adds information concerning the collected data to the collected data, to thereby create a data to be stored (step S150); and stores the data in the received data buffer 22 (step S151). Then, the data reception part 24 determines whether or not the computer 42 is connected to the storage control device 10 (step S152); and, if the computer 42 is connected thereto (if Yes in step S152), checks whether or not the computer 42 permits a data transfer (step S153). If the data transfer is permitted (if Yes in step S153), the data reception part 24 transfers the data to be stored which is the information equivalent to that stored in the received data buffer 22, to the computer 42 (step S154), and the processing terminates.

On the other hand, in step S152, if the computer 42 is not connected to the storage control device 10 (if No in step S152), the processing terminates. In step S153, if the computer 42 does not permit a data transfer (if No in step S153), the processing also terminates.

With the above-described processing, it is possible to store the data outputted from the measurement targets 40, 41 in the storage medium 43, and at the same time, to transfer the data to the computer 42. This allows analysis of the data in the computer 42 on a real-time basis while keeping a backup of the data outputted from the measurement targets 40, 41, in the storage medium 43. Further, because the storage medium 43 can keep the backup data, even if a trouble occurs in the communication path 45 and makes it impossible to transfer data from the storage control device 10 to the computer 42, the data can be analyzed off-line in the computer 42 via the storage medium 43.

Third Embodiment

Figure 10:
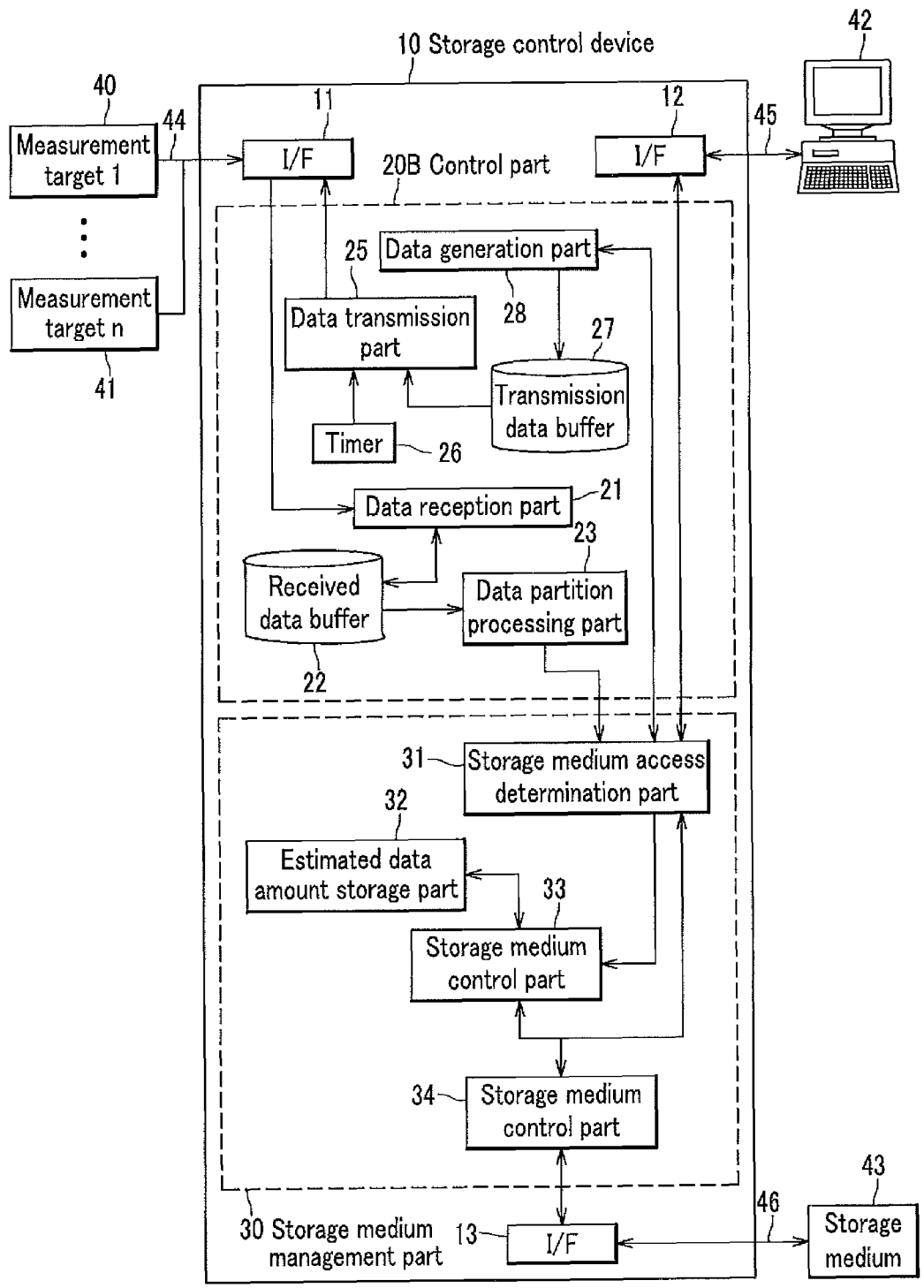
FIG. 10 is a diagram illustrating a data processing system to which a storage control device is applied according to a third embodiment of the present invention.

FIG. 10 is a diagram illustrating a data processing system to which the storage control device 10 is applied according to a third embodiment. The same reference numerals are given to the functions and components in the third embodiment similar to those in the first and second embodiments unless otherwise noted.

In the data processing system according to the third embodiment, a control part 20B has a configuration different from the counterpart in the first embodiment. The control part 20B in this embodiment additionally includes a data generation part 28, a transmission data buffer 27, a data transmission part 25, and a timer 26.

The data generation part 28 generates a transmission data as well as information on the transmission data such as, for example, data transmission timing, specific information on a device as a data output destination, a data transmission route, and a data size, based on previously-stored transmission data information in the storage medium 43; and stores the data and the information in the transmission data buffer 27. The processing performed by the data generation part 28 is described later in detail.

The data transmission part 25 transmits the transmission data stored in the transmission data buffer 27 to the measurement targets 40, 41, using the information on the transmission data stored in the transmission data buffer 27, the transmission timing, and information on the timer 26 for determining a cycle or the like. The processing performed by the data transmission part 25 is described later in detail.

Figure 11:
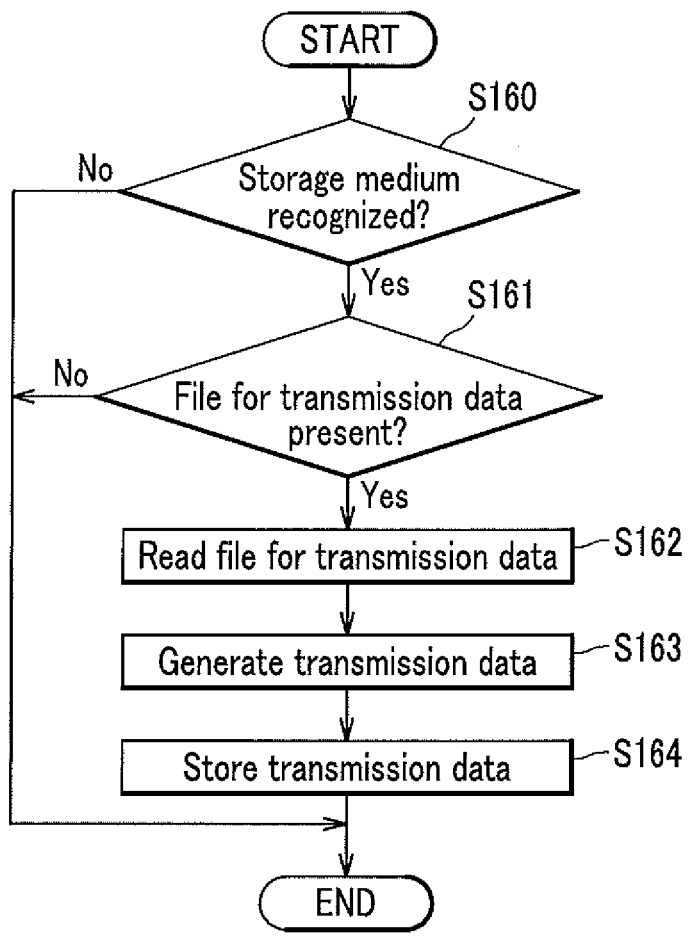
FIG. 11 is a flowchart illustrating a processing performed by a data generation part of the storage control device according to the third embodiment.

FIG. 11 is a flowchart illustrating a processing performed by the data generation part 28 of the storage control device 10 according to the third embodiment. The data generation part 28 stores the transmission data and the information on the transmission data, in the transmission data buffer 27, based on a file containing the transmission data information stored in the storage medium 43.

Referring to FIG. 11, the processing performed by the data generation part 28 is described. The data generation part 28 determines whether or not the storage medium 43 is connected to the storage control device 10 and is recognized, that is, is available (step S160). If it is determined that the storage medium 43 is not connected to the storage control device 10, or is connected but is not available (if No in step S160), the processing terminates. If the storage medium 43 is available (if Yes in step S160), the data generation part 28 determines whether or not a file for transmission data is present in the storage medium 43 (step S161). If the file for transmission data is present in the storage medium 43 (if Yes in step S161), the data generation part 28 reads the file for transmission data (step S162); generates, based on contents of the file for transmission data, the transmission data as well as information on the transmission data such as, for example, data transmission timing, specific information on a device as a data output destination, a data transmission route, and a data size (step S163); and stores the data and the information in the transmission data buffer 27 (step S164). The processing then terminates. On the other hand, in step S161, if no file for transmission data is present (if No in step S161), the processing terminates.

With the above-described processing, a file containing the transmission data information stored in the storage medium 43 is expanded in the transmission data buffer 27. Thus, a user of the storage control device 10 such as the computer 42 can transmit any data to the measurement targets 40, 41, just by generating a file containing the transmission data information, into the storage medium 43.

Figure 12:
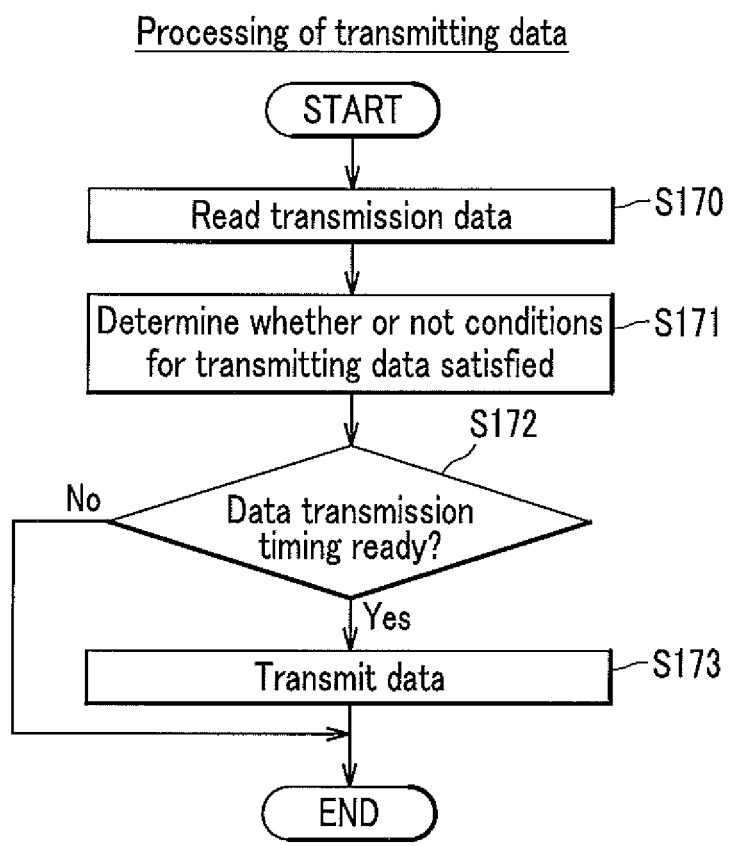
FIG. 12 is a flowchart illustrating a processing performed by a data transmission part of the storage control device according to the third embodiment.

FIG. 12 is a flowchart illustrating a processing performed by the data transmission part 25 of the storage control device 10 according to the third embodiment. The data transmission part 25 transmits a data to the measurement targets 40, 41 using the transmission data and the information on the transmission data stored in the transmission data buffer 27, transmission timing, and information on the timer 26 for determining a cycle or the like.

Referring to FIG. 12, the processing performed by the data transmission part 25 is described. The data transmission part 25 reads the transmission data and the information on the transmission data stored in the transmission data buffer 27 (step S170) and determines whether or not conditions for transmitting a data are satisfied and the timing for the data transmission is ready, using the transmission data and the information on the transmission data stored in the transmission data buffer 27, the transmission timing, and information on the timer 26 for determining a cycle or the like (step S171). If Yes in step S172), the data transmission part 25 transmits the data to the measurement targets 40, 41 (step S173). The processing then terminates. On the other hand, if it is determined that the data transmission timing is not ready (if No in step S172), the processing terminates.

Fourth Embodiment

Figure 13:
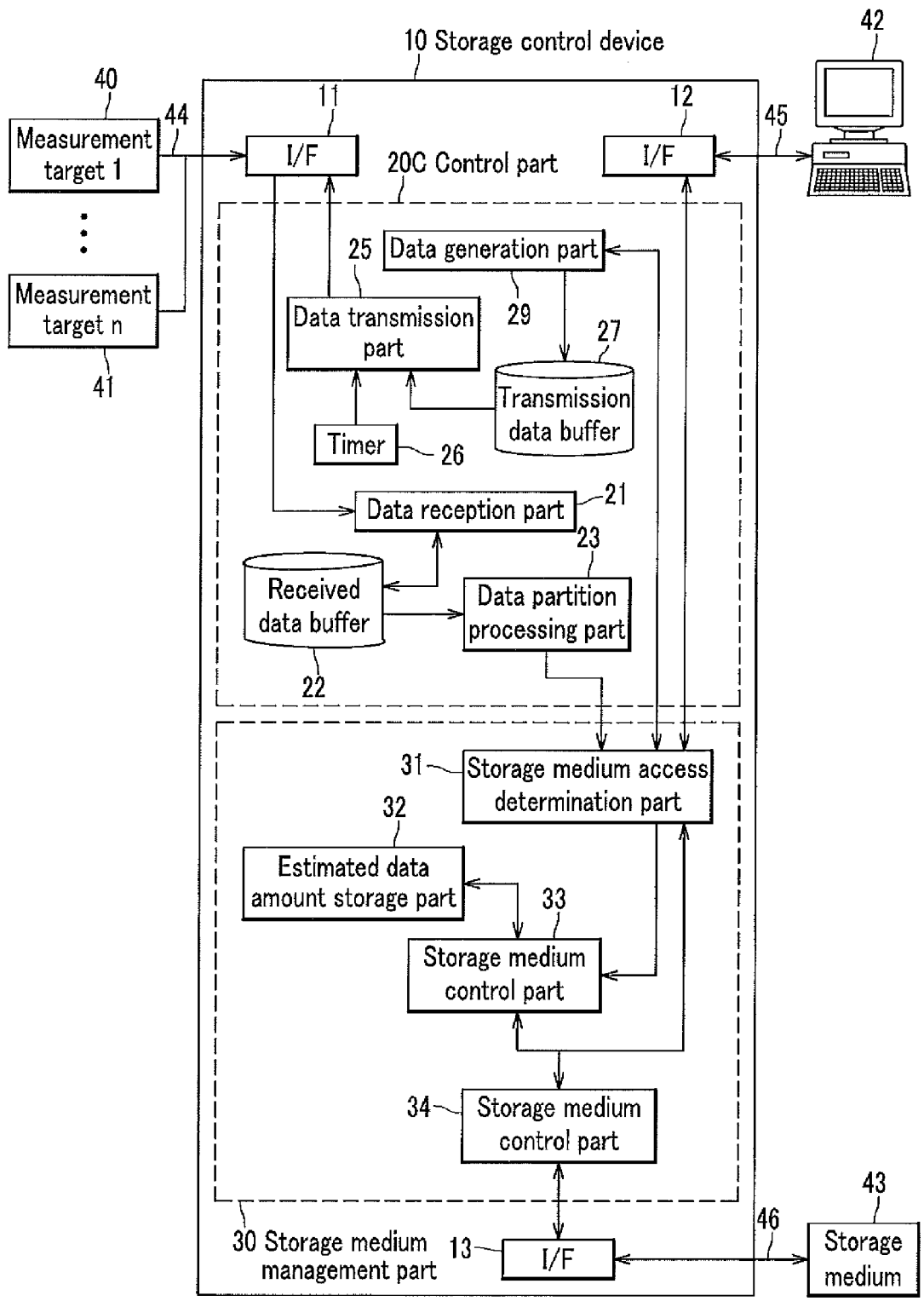
FIG. 13 is a diagram illustrating a data processing system to which a storage control device is applied according to a fourth embodiment of the present invention.

FIG. 13 is a diagram illustrating a data processing system to which the storage control device 10 is applied according to a fourth embodiment. The same reference numerals are given to the functions and components in the fourth embodiment similar to those in the first to third embodiments unless otherwise noted.

In the data processing system in this embodiment, a control part 20C has a configuration different from the counterpart in the third embodiment. The processing performed by the data generation part 28 in the first embodiment shown in FIG. 10 is modified in the control part 20C in the fourth embodiment. Additionally, a data generation part 29 generates information equivalent to the information which the data generation part 28 stores in the transmission data buffer 27, based on a data directly transferred from the computer 42 to the storage control device 10. The data generation part 29 then stores the generated information in the transmission data buffer 27. The processing performed by the data generation part 29 is described below in detail.

Figure 14:
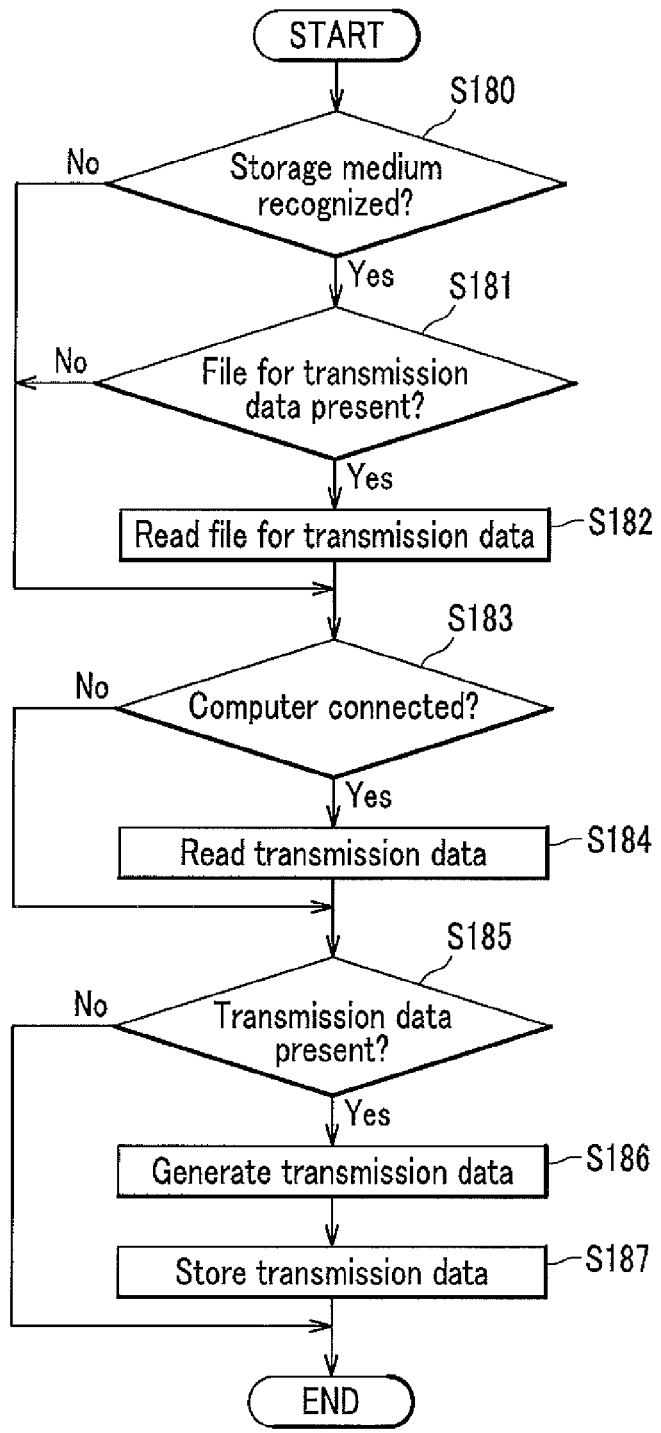
FIG. 14 is a flowchart illustrating a processing performed by a data generation part of the storage control device according to the fourth embodiment.

FIG. 14 is a flowchart illustrating a processing performed by the data generation part 29 of the storage control device 10 according to the fourth embodiment. The data generation part 29 generates information equivalent to the information which the data generation part 28 stores in the transmission data buffer 27, based on the data transferred from the computer 42; and stores the generated information in the transmission data buffer 27.

Referring to FIG. 14, the processing performed by the data generation part 29 is described. Similarly to the data generation part 28, the data generation part 29 first determines whether or not the storage medium 43 is connected to the storage control device 10 and is recognized, that is, is available (step S180). If it is determined that the storage medium 43 is not connected to the storage control device 10, or is connected but is not available (if No in step S180), the processing advances to step S183. If the storage medium 43 is available (if Yes in step S180), the data generation part 29 determines whether or not a file for transmission data is present in the storage medium 43 (step S181). If the file for transmission data is present in the storage medium 43 (if Yes in step S181), the data generation part 29 reads the file for transmission data (step S182). The processing then advances to step S183. On the other hand, if no file for transmission data is present in the storage medium 43 (if No in step S181), the processing advances to step S183.

The data generation part 29 determines whether or not the computer 42 is connected (step S183). If connected, the data generation part 29 reads a transmission data which is transferred from the computer 42 (step S184). The data generation part 29 then: determines whether or not a file for transmission data read from the storage medium 43 or a transmission data transferred from the computer 42 is present (step S185); if the transmission data is present (if Yes in step S185), generates information equivalent to the information which the data generation part 28 shown in FIG. 10 stores in the transmission data buffer 27 (which is the transmission data) (step S186); and stores the transmission data in the transmission data buffer 27 (step S187). The processing then terminates.

On the other hand, in step S183, if the computer 42 is not connected (if No in step S183), the processing advances to step S185. In step S185, if the transmission data is not present (if No in step S185), the processing terminates.

With the above-described processing, the transmission data and the information on the transmission data are transferred from the computer 42. This allows real-time data manipulation of the transmission data, the transmission timing, or the like.

Fifth Embodiment

Figure 15:
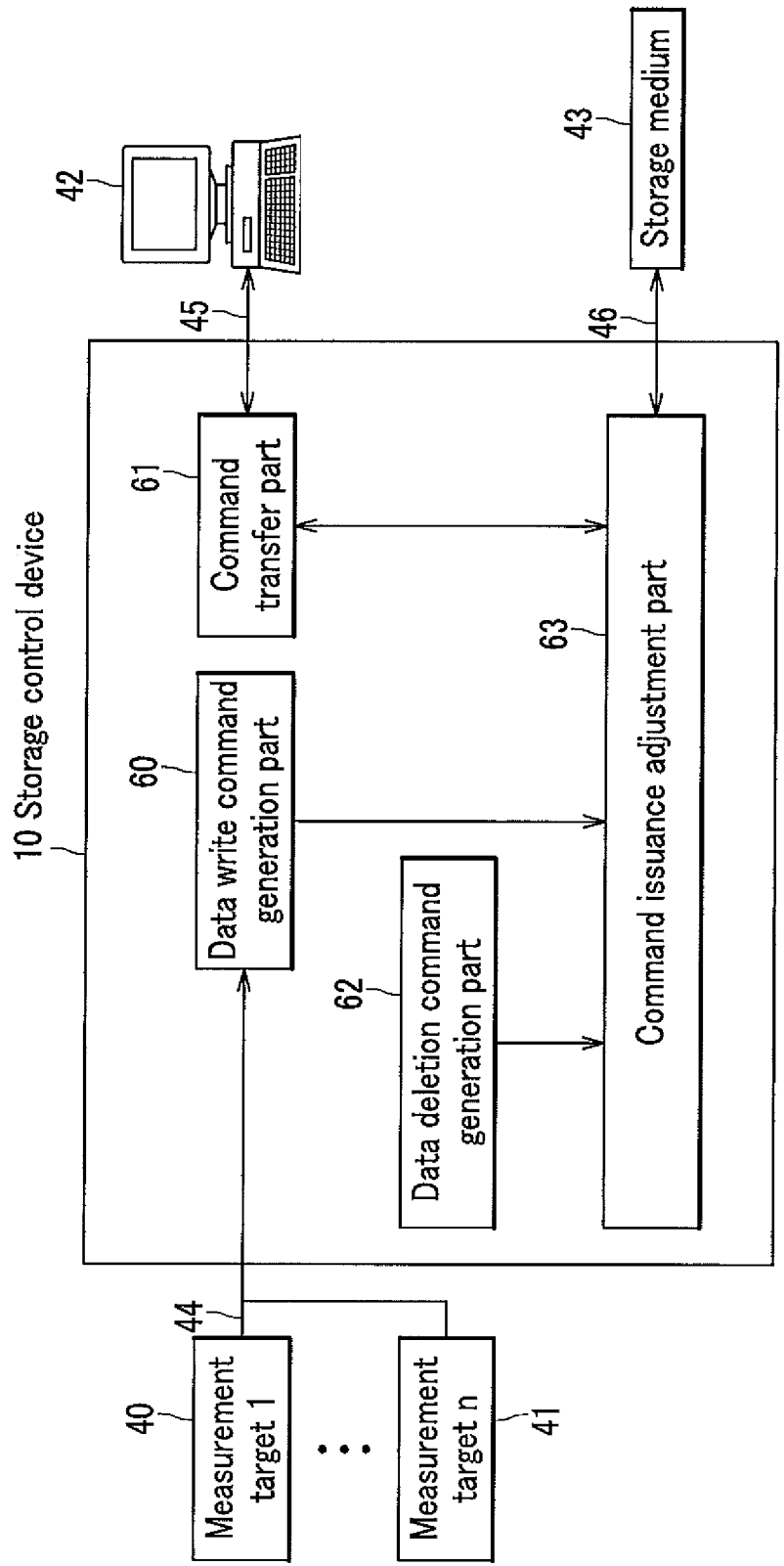
FIG. 15 is a diagram illustrating a data processing system according to a fifth embodiment of the present invention.

FIG. 15 is a diagram illustrating a data processing system according to a fifth embodiment. The same reference numerals are given to the functions and components in the fifth embodiment similar to those in the first to fourth embodiments unless otherwise noted.

Referring to FIG. 15, a configuration of the data processing system is described. Major components of the data processing system include: the storage control device 10 that includes a data write command generation part 60, a command transfer part 61, a data deletion command generation part 62, and a command issuance adjustment part 63; and the storage medium 43 that can be attached to the storage control device 10 and requires a predetermined procedure or means such as issuance of a command when a data is read therefrom or is written therein.

The data write command generation part 60: collects data outputted from the measurement targets 40, 41 via the communication path 44; generates a command such as SCSI and ATAPI in a prescribed cycle so as to write the collected data in the storage medium 43; and transfers the command to the command issuance adjustment part 63.

The command transfer part 61 recognizes a command which is issued in order for the computer 42 to access the storage medium 43 and transfers the command to the command issuance adjustment part 63. The command transfer part 61 also transfers a response to the command issued by the computer 42, from the storage medium 43 to the computer 42.

The data deletion command generation part 62 includes the estimated data amount storage part 32 and the stored data amount adjustment part 33 according to the first to fourth embodiments and directly manages a data amount stored in the storage medium 43 without accessing data in the storage medium 43. If the stored data amount adjustment part 33 determines that a data amount stored in the storage medium 43 satisfies a specific condition, the data deletion command generation part 62 generates a data deletion command and transfers the command to the command issuance adjustment part 63.

In this embodiment, the data deletion command generation part 62 manages the data amount stored in the storage medium 43 without accessing the storage medium 43. This makes it possible to save time and the number of times for access to the storage medium 43. Further, the data deletion command generation part 62 issues a data deletion command under a specific condition. This makes it possible to constantly store an up-to-date data outputted from the measurement targets 40, 41, in the storage medium 43.

The command issuance adjustment part 63 receives a command respectively from the data write command generation part 60, the command transfer part 61, and the data deletion command generation part 62, and adjusts timing of issuing the respective commands to the storage medium 43. Because the command issuance adjustment part 63 adjusts the timing of issuing the respective commands, it is possible to store data outputted from the measurement targets 40, 41, in the storage medium 43 on a real-time basis as well as to complete a response to a command issued by the computer 42 within a prescribed time.

The fifth embodiment is summarized as follows. The data processing system 10 collects data outputted from the measurement targets 40, 41 and stores the collected data in the storage medium 43. In transferring the collected data to the computer 42, the storage medium 43 which is removable requires use of a predetermined procedure of issuing a command when a data is read therefrom or is written therein.

In more detail, the data processing system 10 includes: the data write command generation part 60 that generates a data write command so as to write data outputted from the measurement targets 40, 41, in the storage medium 43;
the command transfer part 61 that transfers a command for a storage medium access issued by the computer 42, to the storage medium 43, and then, transfers a response to the command, from the storage medium 43 to the computer 42;
the data deletion command generation part 62 that: stores a maximum data amount which the storage medium 43 can store therein at the time of startup of the storage control device 10, and a stored data amount which is an initial stored amount of the stored data, in a data amount storage part (for example, the estimated data amount storage part 32); upon receiving a write amount of a data in response to a data write command, writes a new stored data amount calculated by adding the write amount to an already stored data amount, over the already stored data amount; calculates a free space by subtracting the stored data amount from the maximum data amount; determines a deletion amount of the data if the free space does not takes a value not less than a prescribed value; writes a newly-calculated stored data amount calculated by subtracting the deletion amount from the stored data amount, over the stored data amount; and generates a data deletion command for deleting a data stored in the storage medium 43 beginning with the oldest data at specific timing; and
the command issuance adjustment part 63 that adjusts timing of issuing the commands issued from the data write command generation part 60, the command transfer part 61, and the data deletion command generation part 62, to the storage medium 43.

In the present invention, the storage control device performs in parallel a processing of storing data outputted from a plurality of measurement targets such as machines and sensors, in a storage medium, and a processing of transferring the data stored in the storage medium to a computer such as a PC. Thus, even if the computer is not connected to the storage control device, the storage control device by itself can store the collected data in the storage medium. If the computer is connected to the storage control device while the storage control device is collecting data outputted from the measurement targets, the storage control device can transfer, to the computer, the collected data including data which has been collected but not yet been transferred to the computer, while keeping on collecting data. Further, while the computer is being connected to the storage control device, the computer can, for example, analyze real-time data outputted from the measurement targets while making a backup of the collected data.

The storage control device calculates an estimated value of a data amount stored in the storage medium and stores the value in itself. This means that it is not necessary for the storage control device to access the storage medium so as to check the data amount stored in the storage medium. Therefore, a processing of adjusting the data amount stored in the storage medium can be performed at high speed. Further, the storage control device adjusts the data amount stored in the storage medium according to a storage possible capacity of the storage medium. This can prevent fragmentation of a file stored in the storage medium. Therefore, slowdown of an access rate to the storage medium can also be prevented.

The storage control device can hold a backup of data outputted from the measurement targets. Even if a trouble occurs in a communication path between the storage control device and the computer, the data outputted from the measurement targets can be transferred off-line to the computer, which allows the computer to perform analysis or the like retroactively.

The present invention has advantageous effects that a data amount in a storage medium can be immediately adjusted before the storage medium becomes full, and stored log can be effectively utilized.

The invention claimed is:

1. A storage control device which collects data outputted from a plurality of measurement targets and stores the collected data in a storage medium, comprising:
    a control part that makes a write request of the collected data to the storage medium; and
    a storage medium management part that manages a data amount stored in the storage medium,
    wherein the storage medium management part comprises
        a stored data amount adjustment part that: stores a maximum data amount which the storage medium can store at a time of startup of the storage control device, and a first stored data amount which is an initial stored amount of a stored data, in a data amount storage part; upon receiving a write amount of a data in response to a write request, writes a new stored data amount, as a second stored data amount, calculated by adding the write amount to the first already-recorded stored data amount, over the first already-recorded stored data amount; calculates a free space by subtracting the second stored data amount from the maximum data amount; determines a data deletion amount if the free space does not take a value not less than a prescribed value; and writes a third stored data amount calculated by subtracting the deletion amount from the second stored data amount, over the second stored data amount, and
        a storage medium control part that: upon receiving the deletion amount, identifies a data stored in the storage medium and corresponding to the deletion amount; instructs a deletion of the data; and stores the data corresponding to the write request, in the storage medium.

2. The storage control device according to claim 1, wherein the stored data amount is calculated based on the number of files.

3. The storage control device according to claim 1, wherein the storage control device is connected to an external computer via a communication line,
    wherein the control part comprises:
        a data reception part that receives the collected data;
        a received data buffer that, upon receiving the collected data, temporarily holds the received collected data; and
        a data partition processing part that partitions the collected data stored in the received data buffer into blocks according to a prescribed condition and makes a write request of the stored collected data to the storage medium,
    wherein the storage medium management part further comprises a storage medium access determination part that determines, upon receipt of a request, whether the request is a read request from the computer or a write request from the control part and provides control of prioritizing the write request, and
    wherein the storage medium access determination part transmits, upon receiving the write request, a write amount of a data corresponding to the write request, to the stored data amount adjustment part, and also transmits the data corresponding to the write request, to the storage medium control part.

4. The storage control device according to claim 3, wherein the data reception part is connected to the computer via the communication line and transfers the data in the received data buffer without passing the data through the storage medium.

5. The storage control device according to claim 3, wherein the control part comprises:
    a data generation part that generates a data to be outputted to the measurement targets, based on a file containing information on the transmission data stored in the storage medium;
    a transmission data buffer that holds the data to be outputted to the measurement targets;
    a timer that is used for determining transmission timing to output the data to the measurement targets; and
    a data transmission part that outputs the data to the measurement targets, based on a value set by the timer.

6. The storage control device according to claim 5, wherein the data generation part is connected to the computer via the communication line, receives a data containing information on the transmission data from the computer, and stores the data in the transmission data buffer.

7. A data processing system which collects data outputted from a plurality of measurement targets, stores the collected data in a storage medium, and also transfers the collected data to a computer, the storage medium being removable and requiring use of a predetermined procedure of issuing a command when a data is read therefrom or is written therein, the data processing system, comprising:
    a data write command generation part that generates a data write command for writing the data outputted from the measurement targets, in the storage medium;
    a command transfer part that transfers a command for an access to the storage medium access issued by the computer, to the storage medium, and also transfers a response to the command from the storage medium to the computer;
    a data deletion command generation part that: stores a maximum data amount which the storage medium can store at a time of startup of the storage control device, and a first stored data amount which is an initial stored amount of a stored data, in a data amount storage part; upon receiving a write amount of a data in response to a write request, writes a new stored data amount, as a second stored data amount, calculated by adding the write amount to the first already-recorded stored data amount, over the first already-recorded stored data amount; calculates a free space by subtracting the second stored data amount from the maximum data amount; determines a data deletion amount if the free space does not take a value not less than a prescribed value; writes a third stored data amount calculated by subtracting the deletion amount from the second stored data amount, over the second stored data amount; and generates a data deletion command for deleting a data stored in the storage medium beginning with the oldest data at specific timing; and a command issuance adjustment part that adjusts timing of issuing the commands issued from the data write command generation part, the command transfer part, and the data deletion command generation part, to the storage medium.

\* \* \* \* \*